United States Patent
Reyes et al.

(10) Patent No.: US 11,773,313 B2
(45) Date of Patent: Oct. 3, 2023

(54) SINGLE-FLUID MIXED SCALE DISSOLUTION

(71) Applicant: Halliburton Energy Services, Inc., Houston, TX (US)

(72) Inventors: Enrique Antonio Reyes, Tomball, TX (US); Sarai Santos, Mexico City (MX); Kristina Henkel Holan, Cypress, TX (US); Antonio Recio, III, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/403,659

(22) Filed: Aug. 16, 2021

(65) Prior Publication Data

US 2023/0056620 A1 Feb. 23, 2023

(51) Int. Cl.
*C09K 8/528* (2006.01)
*E21B 37/06* (2006.01)
*E21B 43/22* (2006.01)

(52) U.S. Cl.
CPC .............. *C09K 8/528* (2013.01); *E21B 37/06* (2013.01)

(58) Field of Classification Search
CPC .... C09K 8/528; C09K 2208/32; C09K 8/524; C09K 8/52; C09K 8/54; E21B 37/06; E21B 41/02
See application file for complete search history.

(56) References Cited

U.S. PATENT DOCUMENTS

| | | | |
|---|---|---|---|
| 3,706,669 A | 12/1972 | Gardner | |
| 3,951,827 A | 4/1976 | Burroughs et al. | |
| 4,096,869 A | 6/1978 | Lawson | |
| 4,096,969 A | 6/1978 | Ragusa | |
| 4,747,975 A | 5/1988 | Ritter | |
| 5,026,481 A | 6/1991 | Paul et al. | |
| 5,282,995 A | 2/1994 | Paul et al. | |
| 5,685,918 A | 11/1997 | Tate | |
| 6,331,513 B1 | 12/2001 | Zaid et al. | |
| 6,494,218 B1 | 12/2002 | Zaid et al. | |
| 7,470,330 B2 | 12/2008 | Keatch | |
| 8,236,734 B1 | 8/2012 | Shen et al. | |
| 2015/0083669 A1 | 3/2015 | Matherly et al. | |

(Continued)

FOREIGN PATENT DOCUMENTS

| AU | 2009207667 A1 * | 8/2010 | ................ C02F 5/12 |
|---|---|---|---|
| CA | 2659813 A1 * | 2/2008 | ................ C02F 5/10 |

(Continued)

OTHER PUBLICATIONS

Translation of AU 2009207667. (Year: 2010).*

(Continued)

*Primary Examiner* — Zakiya W Bates
(74) *Attorney, Agent, or Firm* — Barnes & Thornburg LLP (57) ABSTRACT

Methods and treatment fluids for removing mixed scale. A treatment fluid is introduced into a wellbore comprising a mixed scale of interspersed calcium carbonate and calcium sulfate. The treatment fluid comprises: phosphonomethyliminodiacetic acid, N,N-bis(phosphonomethyl)glycine, or a combination thereof; and an aqueous base fluid. The treatment fluid has a pH in a range between about 6 to about 8. The method further comprises contacting the mixed scale with the treatment fluid.

20 Claims, 5 Drawing Sheets

(56) References Cited

U.S. PATENT DOCUMENTS

| | | | |
|---|---|---|---|
| 2015/0175872 A1 | 6/2015 | Bertkau et al. | |
| 2015/0211345 A1 | 7/2015 | Reyes et al. | |
| 2017/0074072 A1* | 3/2017 | Peters | E21B 43/088 |
| 2017/0198195 A1 | 7/2017 | Beuterbaugh et al. | |
| 2017/0313927 A1 | 11/2017 | Mason | |
| 2018/0037805 A1 | 2/2018 | Utschig-Samuels et al. | |
| 2021/0079289 A1* | 3/2021 | Reyes | C09K 8/528 |

FOREIGN PATENT DOCUMENTS

| | | | | |
|---|---|---|---|---|
| CA | 2685832 A1 * | 11/2008 | | C02F 5/10 |
| CN | 106867490 A | 6/2017 | | |
| EP | 1301576 B1 | 11/2011 | | |
| WO | 9011972 A1 | 10/1990 | | |
| WO | 2016130127 A1 | 8/2016 | | |
| WO | 2019041023 A1 | 3/2019 | | |
| WO | 2020018080 A1 | 1/2020 | | |

OTHER PUBLICATIONS

Reyes-Garcia, Enrique Antonio, and Kristina Henkel Holan. "Are Scale-Dissolver Enhancers Necessary for Calcium Sulfates?." SPE International Oilfield Scale Conference and Exhibition. OnePetro, 2020.

Garcia-Olvera, G., et al. "A Novel Solution to Remove Carbonate and Sulfate Scale in Electric Submersible Pumps, Offshore Oil Wells in the Gulf of Mexico." SPE International Oilfield Scale Conference and Exhibition. OnePetro, 2018.

Reyes-Garcia, Enrique, and Kristina Holan. "Removing Scale Damage with Fast-Acting Anhydrite CaSO4 Removal System." SPE International Conference and Exhibition on Formation Damage Control. OnePetro, 2020.

Reyes-Garcia, Enrique, et al. "Operational Efficiency Gains in the Removal of Calcium Sulfate Scale from Electric Submersible Pumps in Offshore Wells." SPE Annual Technical Conference and Exhibition. OnePetro, 2020.

Hassan, Amjed M., and Hasan S. Al-Hashim. "Surface charge study of EDTA interaction with carbonate rock during chelating agent flooding." Journal of Petroleum Science and Engineering 191 (2020): 107163.

International Search Report and Written Opinion dated Apr. 11, 2019, International PCT Application No. PCT/US2018/042522.

Smith, C. F., T. J. Nolan, and P. L. Crenshaw. "Removal and inhibition of calcium sulfate scale in waterflood projects." Journal of Petroleum Technology 20.11 (1968): 1249-1256.

International Search Report & Written Opinion in PCT/US2022/034074 dated Oct. 13, 2022.

\* cited by examiner

SINGLE-FLUID MIXED SCALE DISSOLUTION

TECHNICAL FIELD

The present disclosure relates generally to well remediation operations, and more particularly, to treating mixed scale by dissolving and removing the mixed scale in a single-fluid treatment.

BACKGROUND

Scaling occurs from the deposition of scale on surfaces within a wellbore, for example, the surfaces of wellbore tools and equipment. Scaling may reoccur frequently over the lifetime of the well. The scale may coat perforations, casing, production tubulars, valves, pumps, and downhole completion equipment. Scaling may lead to decreases in production and recovery by creating artificial chokes and restricting flowthrough of produced fluids. In extreme cases, scaling may require abandonment if the scaling is so severe that the well is no longer economically viable.

Scale can be present in a variety of species, for example both calcium carbonate and calcium sulfate scale may be present to provide a mixed scale. A mixed scale requires different treatments as the different chemical makeup of each scale requires a different technique. For example, calcium carbonate may be removed with an acid fluid which can be corrosive for wellbore equipment and require corrosion inhibitors, whereas calcium sulfate may require a caustic fluid with a pH greater than 9. As such, it can be a difficult and tedious operation to treat a wellbore when mixed scale is present.

Regardless of scale species, scale may need to be removed to prevent losses in production. The present invention provides improved methods and compositions for removing scale in a wellbore.

BRIEF DESCRIPTION OF THE DRAWINGS

Illustrative examples of the present disclosure are described in detail below with reference to the attached drawing figures, which are incorporated by reference herein, and wherein.

The illustrated figures are only exemplary and are not intended to assert or imply any limitation with regard to the environment, architecture, design, or process in which different examples may be implemented.

DETAILED DESCRIPTION

The present disclosure relates generally to well remediation operations, and more particularly, to treating mixed scale by dissolving and removing the mixed scale in a single-fluid treatment.

In the following detailed description of several illustrative examples, reference is made to the accompanying drawings that form a part hereof, and in which is shown by way of illustration specific examples that may be practiced. These examples are described in sufficient detail to enable those skilled in the art to practice them, and it is to be understood that other examples may be utilized and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The terms uphole and downhole may be used to refer to the location of various components relative to the bottom or end of a well. For example, a first component described as uphole from a second component may be further away from the end of the well than the second component. Similarly, a first component described as being downhole from a second component may be located closer to the end of the well than the second component.

Examples of the treatment fluid and method described herein relate to the use of a treatment fluid to dissolve mixed scale. Advantageously, the treatment fluid utilizes a single-fluid to remove the mixed scale. As such, the treatment fluid may remove interspersed scale of both calcium carbonate and calcium sulfate without the need for additional treatment fluids or other process operations. An additional advantage is that the single-fluid removal does not require further mechanical intervention such as bailing, running a pig, etc. The treatment fluid contacts the scaled portion of the wellbore and/or wellbore equipment and is able to dissolve mixed scale in a short period. The treatment fluid comprising the dissolved mixed scale is then pumped out of the wellbore without the need for additional remediation operations. A further advantage of the treatment fluid is that it may dissolve the mixed scale in a relatively short period compared to other scale remediation operations, for example, the total reaction may be six hours or less. One other advantage is that the treatment fluid does not require recirculation and thus does not need additional wellbore equipment. The treatment fluid need only remain static in the wellbore at the target location to soak the scaled equipment or formation for a desired reaction time, at which point it may be removed from the wellbore. A still further advantage is that the treatment fluid does not require catalysts or conversion agents. Examples of conversion agents, or pH control agents, include, but are not limited to, such a bicarbonate or carbonate. Examples of catalysts which may be excluded include, but are not limited to, carboxylate-containing alkanols, carboxylated alkyl halides (also known as halogenoalkane or alkyl halide where the halide is one of F, Cl, Br, or I), and/or multicarboxylic acids comprising at least an alpha-, beta-, or gamma-hydroxy acid, aromatic derivatives thereof, or combinations thereof. Another advantage of the treatment fluid is that it is not corrosive and does not degrade wellbore conduits, tubing, and/or tools and further does not require corrosion inhibitors.

Figure 1:
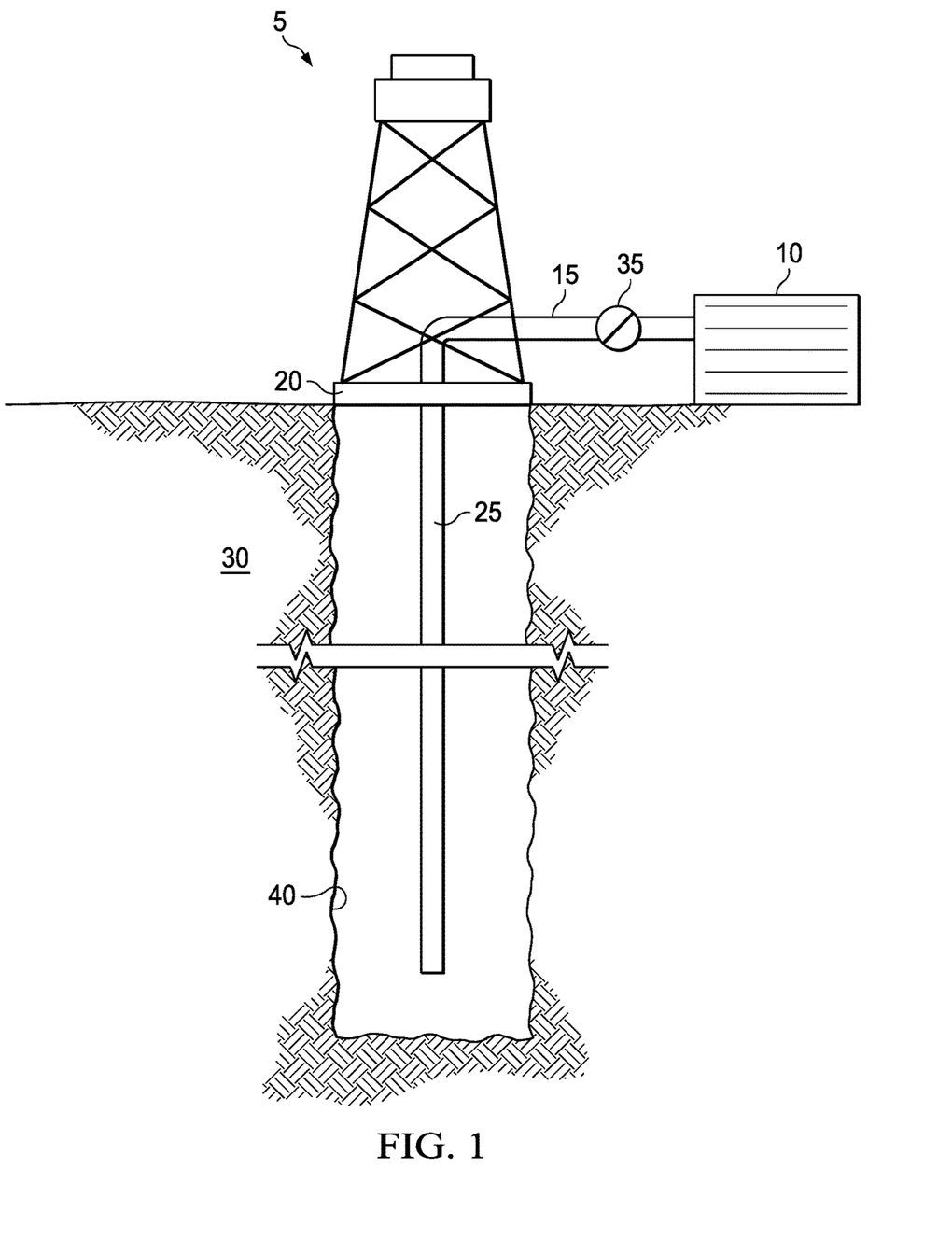
FIG. 1 is a schematic illustrating a surface portion of an example treatment fluid delivery system for delivering a treatment fluid to a target downhole location in accordance with one or more examples described herein.

FIG. 1 is a schematic illustrating a surface portion of an example treatment fluid delivery system 5 for delivering a treatment fluid to a target downhole location. It should be understood that while FIG. 1 generally depicts a land-based system, it is to be recognized that like systems may be operated in subsea locations as well and may include subsea equipment and installations such as risers, tiebacks, flow lines, pumps, mandrels; equally, different maritime units and installations such as floating production offloading vessel are applicable. The treatment fluid delivery system 5 may include mixing tank 10, in which a treatment fluid of the present disclosure may be formulated. The treatment fluid may be conveyed via line 15 to wellhead 20, where the treatment fluid enters tubular 25. Line 15 may be any type of conduit for conveying the treatment fluid. Tubular 25 extends from wellhead 20 into subterranean formation 30. In some examples, tubular 25 may include orifices that allow the treatment fluid to enter into the wellbore 40. Pump 35 may be configured to raise the pressure of the treatment fluid to a desired degree before its introduction into tubular 25. It is to be recognized that treatment fluid delivery system 5 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Mixing tank 10 may be upstream of pump 35 and may comprise a vessel in which the components of the treatment fluid are provided and formulated with a carrier fluid in order to produce the treatment fluid. In various examples, pump 35 (e.g., a low-pressure pump, a high-pressure pump, or a combination thereof) may convey the treatment fluid from mixing tank 10 or other source of the treatment fluid to tubular 25. In other examples, the treatment fluid may be formulated offsite and transported to a worksite, in which case the treatment fluid may be introduced to tubular 25 via pump 35 directly from its shipping container (e.g., a truck, a railcar, a barge, or the like) or from a transport pipeline. In either case, the treatment fluid may be drawn into pump 35, elevated to an appropriate pressure, and then introduced into tubular 25 for delivery downhole.

Pump 35 may be a high-pressure pump in some examples. As used herein, the term "high-pressure pump" will refer to a pump that is capable of delivering a fluid downhole at a pressure of about 1000 psi or greater. The treatment fluids described herein may be introduced with a high-pressure pump. In some examples, the high-pressure pump may be capable of fluidly conveying particulate matter into subterranean formation 30. Suitable high-pressure pumps will be known to one having ordinary skill in the art and may include, but are not limited to, floating piston pumps and positive displacement pumps.

In other examples, the pump 35 may be a low-pressure pump. As used herein, the term "low-pressure pump" will refer to a pump that operates at a pressure of less than about 1000 psi. In some examples, a low-pressure pump may be fluidly coupled to a high-pressure pump that is fluidly coupled to tubular 25. That is, the low-pressure pump may be configured to convey the treatment fluid to the high-pressure pump. In such examples, the low-pressure pump may "step up" the pressure of a treatment fluid before it reaches the high-pressure pump. Alternatively, the low-pressure pump may be used to directly introduce the treatment fluid to subterranean formation 30.

Figure 2:
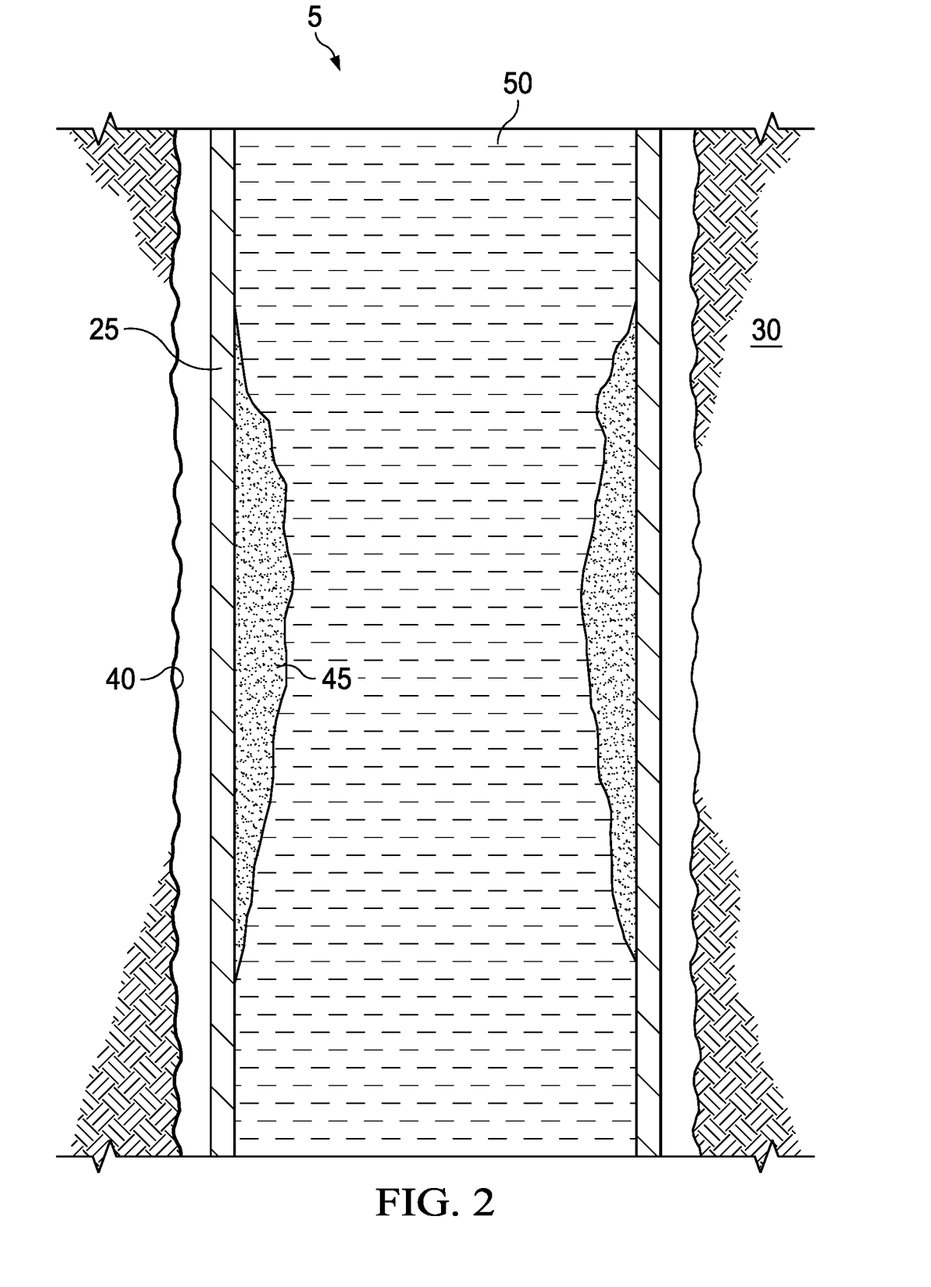
FIG. 2 is a schematic illustrating a downhole portion of the example treatment fluid delivery system illustrated in FIG. 1 in accordance with one or more examples described herein.

FIG. 2 is a schematic illustrating a downhole portion of the example treatment fluid delivery system 5 illustrated in FIG. 1. As illustrated, tubular 25 is disposed within wellbore 40 and comprises mixed scale 45. Mixed scale 45 comprises interspersed calcium carbonate and calcium sulfate. In some examples, mixed scale 45 may restrict fluid flow through tubular 25. In the illustrated example, mixed scale 45 is disposed on the interior of tubular 25. In some examples, mixed scale 45 may be disposed on the exterior of tubular 25. Treatment fluid 50 is pumped into tubular 25 to the target location in which the mixed scale 45 is disposed. Treatment fluid 50 may be pumped to the target location via any method as would be readily apparent to one of ordinary skill in the art. Treatment fluid 50 may be conveyed to said target location via tubular 25, via an annulus between tubular 25 and the wall of subterranean formation 30, or via an annulus between tubular 25 and a conduit concentric with tubular 25. In some optional examples, when placed at the target location, treatment fluid 50 may be allowed to remain static. The well does not need to be shut in or sealed as treatment fluid 50 contacts mixed scale 45, although the well may be shut in or sealed if desired. By remaining "static," it is to be understood that the pumping of treatment fluid 50 is halted and treatment fluid 50 is not circulated in the wellbore 40. Treatment fluid 50 may then contact mixed scale 45 and dissolve at least a portion of mixed scale 45 for a desired reaction time.

In some other examples, treatment fluid 50 may not remain static and may continuously contact mixed scale 45. For example, treatment fluid 50 may be used in a continuous injection operation wherein it may be continuously injected in the tubular 25 (or more broadly, the wellbore) to contact the mixed scale. In still other examples, the treatment fluid 50 may be used in a steam assisted gravity drainage operation whereby the treatment 50 fluid may be injected into an adjacent well to flow into the target well.

Although not depicted in FIG. 2, at the end of the desired reaction time or at the conclusion of the operation, spent treatment fluid 50 may be flowed back to wellhead 20 exiting subterranean formation 30. As spent treatment fluid 50 comprises at least a portion of the dissolved mixed scale 45, the flow through tubular 25 should be improved. In some examples, spent treatment fluid 50 may subsequently be recovered and recycled for future scale remediation operations. In other examples, spent treatment fluid 50 may be not be recycled.

No additional chemical intervention to dissolve the mixed scale or mineral or mechanical intervention steps may be needed. For example, after the spent treatment fluid 50 is pumped out of the wellbore 40, there may be no need for bailing or jetting. At the end of the operation, the spent treatment fluid 50 may be flowed out of the wellbore using any conventional pumping equipment of method. Wellbore operations may then proceed.

Although treatment fluid 50 is illustrated as treating tubular 25, it is to be understood that treatment fluid 50 may be used to treat any surface comprising mixed scales 45. These surfaces may include, but should not be limited to, the surfaces of liners, valves, screens, pumps, vessels, conduits, flow control devices, casing, perforations, completion equipment, mixing equipment, flow lines, pipelines, subsea equipment, or any such surface that could comprise or potentially be subject to metal sulfate scaling.

It should be clearly understood that the example treatment fluid delivery system 5 illustrated by FIGS. 1 and 2 is merely a general application of the principles of this disclosure in practice, and a wide variety of other examples are possible. Therefore, the scope of this disclosure is not limited in any manner to the details of FIGS. 1 and 2 as described herein.

The treatment fluid (e.g., treatment fluid 50 as illustrated in FIG. 2) preferably comprises N-Phosphonomethyl iminodiacetic acid ("PMIDA"), N,N-bis(phosphonomethyl) glycine (BPMG), or a combination thereof. The concentration of the PMIDA or BPMG, in the treatment fluid may range from about 1% (w/v) to about 50% (w/v). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the PMIDA and/or BPMG in the treatment fluid may range from about 1% (w/v) to about 50% (w/v), from about 3% (w/v) to about 50% (w/v), from about 5% (w/v) to about 50% (w/v), from about 10% (w/v) to about 50% (w/v), from about 15% (w/v) to about 50% (w/v), from about 20% (w/v) to about 50% (w/v), from about 25% (w/v) to about 50% (w/v), from about 30% (w/v) to about 50% (w/v), from about 35% (w/v) to about 50% (w/v), from about 40% (w/v) to about 50% (w/v), or from about 45% (w/v) to about 50% (w/v). As another example, the concentration of the PMIDA and/or BPMG in the treatment fluid may range from about 1% (w/v) to about 50% (w/v), from about 1% (w/v) to about 45% (w/v), from about 1% (w/v) to about 40% (w/v), from about 1% (w/v) to about 35% (w/v), from about 1% (w/v) to about 30% (w/v), from about 1% (w/v) to about 25% (w/v), from about 1% (w/v) to about 20% (w/v), from about 1% (w/v) to about 15% (w/v), from about 1% (w/v) to about 10% (w/v), from about 1% (w/v) to about 5% (w/v), or from about 1% (w/v) to about 3% (w/v). With the benefit of this disclosure, one of ordinary skill in the art will be readily able to prepare a treatment fluid having a sufficient concentration of PMIDA and/or BPMG for a given application.

In some examples, the treatment fluid may be provided as an emulsion, microemulsion, nanoemulsion, or dispersion.

In some optional examples, the treatment fluid comprises a chelating agent. Examples of the chelating agent include, but are not limited to, hydroxyethylenediaminetetraacetic acid (EDTA), N-(2-hydroxyethyl)ethylenediaminetriacetic acid (HEDTA), hydroxyethyliminodiacetic acid (HEIDA), methylglycine diacetic acid (MGDA), gluconic acid diacetic acid (GLDA), ethylenediaminedisuccinic acid (EDDS), beta-alaninediacetic acid (beta-ADA), diethylenetriaminepentaacetic acid (DTPA), cyclohexylenediaminetetraacetic acid (CDTA), nitrilotriacetic acid (NTA), diphenylaminesulfonic acid (DPAS), polyaminoacids, polyaspartic acid, polyitaconic acid, polysuccinic acid, polylactic acid, polyglycolic acid, or any combination thereof.

The concentration of the chelating agent in the treatment fluid may range from about 1% (w/v) to about 40% (w/v). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the chelating agent in the treatment fluid may range from about 1% (w/v) to about 40% (w/v), from about 3% (w/v) to about 40% (w/v), from about 5% (w/v) to about 40% (w/v), from about 10% (w/v) to about 40% (w/v), from about 15% (w/v) to about 40% (w/v), from about 20% (w/v) to about 40% (w/v), from about 25% (w/v) to about 40% (w/v), from about 30% (w/v) to about 40% (w/v), or from about 35% (w/v) to about 40% (w/v). As another example, the concentration of the chelating agent in the treatment fluid may range from about 1% (w/v) to about 40% (w/v), from about 1% (w/v) to about 35% (w/v), from about 1% (w/v) to about 30% (w/v), from about 1% (w/v) to about 25% (w/v), from about 1% (w/v) to about 20% (w/v), from about 1% (w/v) to about 15% (w/v), from about 1% (w/v) to about 10% (w/v), from about 1% (w/v) to about 5% (w/v), or from about 1% (w/v) to about 3% (w/v). With the benefit of this disclosure, one of ordinary skill in the art will be readily able to prepare a treatment fluid having a sufficient concentration of chelating agent for a given application.

In some optional examples, the treatment fluid comprises a surfactant. Examples of the surfactant include, but are not limited to, fatty acid alkoxylates, amine oxides, alkanolamides, alkoxylated alcohols, alkylamine alkoxylates, alkyl glycosides, or any combination thereof.

The concentration of the surfactant in the treatment fluid may range from about 0.1% (w/v) to about 10% (w/v). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the surfactant in the treatment fluid may range from about 0.1% (w/v) to about 10% (w/v), from about 0.1% (w/v) to about 10% (w/v), from about 0.5% (w/v) to about 10% (w/v), from about 1% (w/v) to about 10% (w/v), from about 2% (w/v) to about 10% (w/v), from about 3% (w/v) to about 10% (w/v), from about 4% (w/v) to about 10% (w/v), from about 5% (w/v) to about 10% (w/v), from about 6% (w/v) to about 10% (w/v), from about 7% (w/v) to about 10% (w/v), from about 8% (w/v) to about 10% (w/v), or from about 9% (w/v) to about 10% (w/v). As another example, the concentration of the anion in the treatment fluid may range from about 0.1% (w/v) to about 10% (w/v), from about 0.1% (w/v) to about 9% (w/v), from about 0.1% (w/v) to about 8% (w/v), from about 0.1% (w/v) to about 7% (w/v), from about 0.1% (w/v) to about 6% (w/v), from about 0.1% (w/v) to about 5% (w/v), from about 0.1% (w/v) to about 4% (w/v), from about 0.1% (w/v) to about 3% (w/v), from about 0.1% (w/v) to about 2% (w/v), or from about 0.1% (w/v) to about 1% (w/v). With the benefit of this disclosure, one of ordinary skill in the art will be readily able to prepare a treatment fluid having a sufficient concentration of surfactant for a given application.

In some optional examples, the treatment fluid comprises an anion. Examples of the anion include, but are not limited to, a halide, an alkanol amine, a trialkylamine, a polyamine, an oxoanion, an anionic surfactant, derivatives thereof, or any combination thereof.

The concentration of the anion in the treatment fluid may range from about 0.05% (w/v) to about 9.5% (w/v). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the anion in the treatment fluid may range from about 0.05% (w/v) to about 9.5% (w/v), from about 0.1% (w/v) to about 9.5% (w/v), from about 0.5% (w/v) to about 9.5% (w/v), from about 1% (w/v) to about 9.5% (w/v), from about 2% (w/v) to about 9.5% (w/v), from about 3% (w/v) to about 9.5% (w/v), from about 4% (w/v) to about 9.5% (w/v), from about 5% (w/v) to about 9.5% (w/v), from about 6% (w/v) to about 9.5% (w/v), from about 7% (w/v) to about 9.5% (w/v), from about 8% (w/v) to about 9.5% (w/v), or from about 9% (w/v) to about 9.5% (w/v). As another example, the concentration of the anion in the treatment fluid may range from about 0.05% (w/v) to about 9.5% (w/v), from about 0.05% (w/v) to about 9% (w/v), from about 0.05% (w/v) to about 8% (w/v), from about 0.05% (w/v) to about 7% (w/v), from about 0.05% (w/v) to about 6% (w/v), from about 0.05% (w/v) to about 5% (w/v), from about 0.05% (w/v) to about 4% (w/v), from about 0.05% (w/v) to about 3% (w/v), from about 0.05% (w/v) to about 2% (w/v), from about 0.05% (w/v) to about 1% (w/v), from about 0.05% (w/v) to about 0.5% (w/v), or from about 0.05% (w/v) to about 0.1% (w/v). With the benefit of this disclosure, one of ordinary skill in the art will be readily able to prepare a treatment fluid having a sufficient concentration of an anion for a given application.

The treatment fluid comprises an aqueous base fluid, also known as an aqueous carrier fluid. The aqueous base fluid may be from any source, provided that it does not contain an excess of compounds that may undesirably affect other components in the treatment fluid. In various examples, the aqueous base fluid may comprise fresh water, salt water, seawater, brine, or an aqueous salt solution. In some examples, the aqueous base fluid may comprise a monovalent brine or a divalent brine. Suitable monovalent brines include, but are not limited to, sodium chloride brines, sodium bromide brines, potassium chloride brines, potassium bromide brines, and the like. Suitable divalent brines include, but are not limited to, magnesium chloride brines, calcium chloride brines, and the like.

The concentration of the aqueous base fluid in the treatment fluid may range from about 0.5% (w/v) to about 85% (w/v). The concentration of the aqueous base fluid in the treatment fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the aqueous base fluid in the treatment fluid may range from about 0.5% (w/v) to about 85% (w/v), from about 1% (w/v) to about 85% (w/v), from about 5% (w/v) to about 85% (w/v), from about 10% (w/v) to about 85% (w/v), from about 15% (w/v) to about 85% (w/v), from about 20% (w/v) to about 85% (w/v), from about 25% (w/v) to about 85% (w/v), from about 30% (w/v) to about 85% (w/v), from about 35% (w/v) to about 85% (w/v), from about 40% (w/v) to about 85% (w/v), from about 45% (w/v) to about 85% (w/v), from about 50% (w/v) to about 85% (w/v), from about 55% (w/v) to about 85% (w/v), from about 60% (w/v) to about 85% (w/v), from about 65% (w/v) to about 85% (w/v), from about 70% (w/v) to about 85% (w/v), from about 75% (w/v) to about 85% (w/v), or from about 80% (w/v) to about 85% (w/v). As another example, the concentration of the aqueous base fluid in the treatment fluid may range from about 0.5% (w/v) to about 85% (w/v), from about 0.5% (w/v) to about 80% (w/v), from about 0.5% (w/v) to about 75% (w/v), from about 0.5% (w/v) to about 70% (w/v), from about 0.5% (w/v) to about 65% (w/v), from about 0.5% (w/v) to about 60% (w/v), from about 0.5% (w/v) to about 55% (w/v), from about 0.5% (w/v) to about 50% (w/v), from about 0.5% (w/v) to about 45% (w/v), from about 0.5% (w/v) to about 40% (w/v), from about 0.5% (w/v) to about 35% (w/v), from about 0.5% (w/v) to about 30% (w/v), from about 0.5% (w/v) to about 25% (w/v), from about 0.5% (w/v) to about 20% (w/v), from about 0.5% (w/v) to about 15% (w/v), from about 0.5% (w/v) to about 10% (w/v), from about 0.5% (w/v) to about 5% (w/v), or from about 0.5% (w/v) to about 1% (w/v). With the benefit of this disclosure, one of ordinary skill in the art will be able to prepare a treatment fluid having an aqueous base fluid for a given application.

The treatment fluid further comprises a pH adjustor. The pH adjustor may be any base sufficient for adjusting the pH of the treatment fluid to a range of about 6 to about 8 without negatively impacting the functionality of the other treatment fluid components. General examples of the pH adjustor include, but are not limited to, any hydroxide or metal hydroxide, borates, or a combination thereof. Specific examples of the pH adjustor include, but are not limited to, ammonium hydroxide, sodium hydroxides, manganese(II) hydroxide, barium hydroxide octahydrate, aluminum hydroxide, calcium hydroxide, iron(III) hydroxide, barium hydroxide, magnesium hydroxide, potassium hydroxide, chromium(III) hydroxide, tin(IV) hydroxide, chromium(II) hydroxide, silver hydroxide, lead(IV) hydroxide, platinum (IV) hydroxide, zinc hydroxide, copper(II) hydroxide, beryllium hydroxide, vanadium(V) hydroxide, iron(II) hydroxide, manganese(IV) hydroxide, lead(II) hydroxide, strontium hydroxide, tin(II) hydroxide, vanadium(III) hydroxide, lithium hydroxide, mercury(II) hydroxide, nickel (II) hydroxide, mercury(I) hydroxide, copper(I) hydroxide, tetraethylammonium hydroxide, tetrabutylammonium hydroxide, choline hydroxide, urea and tetrabutyl urea, isobutylene diurea, derivatives thereof, or any combination thereof. A preferred example of the pH adjustor is ammonium hydroxide.

In some examples, the treatment fluid may provide a mixed scale dissolution of 75% or greater in a reaction time of less than 4 hours. In a specific example, the treatment fluid may dissolve greater than 80% of the mixed scale in a reaction time of less than 2 hours. In another specific example, the treatment fluid may dissolve greater than 80% of the mixed scale in a reaction time of less than 1 hour.

The mixed scale to be treated comprises calcium carbonate and calcium sulfate and may include any polymorph of calcium sulfate. For example, the calcium sulfate may include, but is not limited to, gypsum, anhydrite, and basanite (e.g., hemihydrate), or any combination thereof. The mixed scale is interspersed scale with the two species of scale distributed together. The mixed scale may have a ratio of calcium carbonate to calcium sulfate in a range of between about 90/10 to about 25/75.

In some optional examples, the treatment fluid may comprise an additive. The additive may be used to adjust a property of the treatment fluid, for example, viscosity, density, etc. Examples of the additives include, but are not limited to, silica scale control additives, corrosion inhibitors, surfactants, gel stabilizers, anti-oxidants, polymer degradation prevention additives, relative permeability modifiers, scale inhibitors, foaming agents, defoaming agents, anti-foaming agents, emulsifying agents, de-emulsifying agents, iron control agents, proppants or other particulates, particulate diverters, salts, fluid loss control additives, gas, catalysts, clay control agents, dispersants, flocculants, scavengers (e.g., $H_2S$ scavengers, $CO_2$ scavengers or $O_2$ scavengers), gelling agents, lubricants, friction reducers, bridging agents, viscosifiers, weighting agents, solubilizers, hydrate inhibitors, consolidating agents, bactericides, clay stabilizers, breakers, delayed release breakers, the like, or any combination thereof. With the benefit of this disclosure, one of ordinary skill in the art and the benefit of this disclosure will be able to formulate a treatment fluid having properties suitable for a desired application.

The treatment fluid wellbore clean-up method is a single-fluid method comprising contact of the mixed scale with the treatment fluid. The method may not require a pre-flush or wellbore conditioning step. Such steps may include an aqueous based pre-flush fluid that displaces any wellbore and formation fluid, typically a brine; a hydrocarbon removing step or pill that consists of an organic solvent agent to remove deposits of hydrocarbon phases that can prevent the contact of the dissolving agent with the mineral scale, for instance xylene, toluene, diesel, kerosene, heavy napthas; and a spacer fluid or suitable brine to prevent mixing of the organic solvent stage with the treatment fluid or dissolver stage. Alternatively, the treatment method may be utilized in reservoirs that are designed for geothermal energy operations. A geothermal operation is one where a fluid is injected into a subterranean well and is circulated through a tubing configuration that is subjected to a temperature sufficiently high (at least 100° C., and much higher, reaching temperatures up to 500° C. where there is geologic activity such as volcanism) to generate thermal exchange with the injected fluid. The injected fluid is typically water but alternatively can be carbon dioxide; other fluids capable of exchanging heat in the subterranean environment can be considered. The heated fluid is then circulated or transported to a surface installation where the thermal energy is extracted to generate work, such as driving a turbine or another device.

The treatment fluid may be used to remove mixed scale in a variety of wellbore equipment including, but not limited to, pumps such as submersible pumps, flowlines, pipelines, tubing, any steel equipment or containers involved in subterranean energy extraction and production such as hydrocarbon extraction and electrical energy generation via geothermal extraction, etc. It is to be appreciated that the pH of the treatment fluid is in a range of about 6 to about 8 and as such, corrosion inhibitors may not be used in some examples of the treatment fluid.

EXAMPLES

The present disclosure may be better understood by reference to the following examples, which are offered by way of illustration. The present disclosure is not limited to the examples provided herein.

The calcium carbonate was sampled from a core of limestone (>99% CaCO3) obtained from a quarry. The calcium sulfate was specifically the anhydrite mineral (>99% CaSO4), which was obtained from a mine deposit. Each sample was extracted from the bulk rock by cutting with a saw into thin wafers (approximately 0.2- to 0.5-mm thickness), then further cut into a small, single, fragment. These samples were and used without any further purification or processing. The primary parameter is the mass to volume ratio used to delimit the dissolution process. Specifically, the overall mass of minerals to the dissolver fluid volume (m/v) was 0.02; each mineral's mass is 0.5 g. For instance, the samples were allowed to contact 1 g of mixed calcium carbonate and calcium sulfate for either 1, 2, or 4 hours up to 24 hours using a total volume of 50 mL of dissolver fluid. The samples were loaded under atmospheric conditions in a loosely capped jar and placed in a water bath to achieve a reaction temperature of 200° F. The sample was allowed to remain static during the reaction period. The jar was removed after the designated time had elapsed and the remaining sample was removed and weighed.

Example 1

Five experimental samples were prepared having the compositions illustrated by Table 1:

TABLE 1

|  | % (w/v) PMIDA | % (w/v) BPMG | % (w/v) DTPA | % (w/v) EDTA | % (w/v) GLDA | pH |
|---|---|---|---|---|---|---|
| EXP 1 | 20 |  | 0 | 0 | 0 | 6 |
| EXP 2 | 20 |  | 20 | 0 | 0 | 6 |
| EXP 3 | 20 |  | 0 | 20 | 0 | 6 |
| EXP 4 | 20 |  | 0 | 0 | 20 | 6 |
| EXP 5 | 0 | 20 | 0 | 0 | 0 | 6 |

Figure 3:
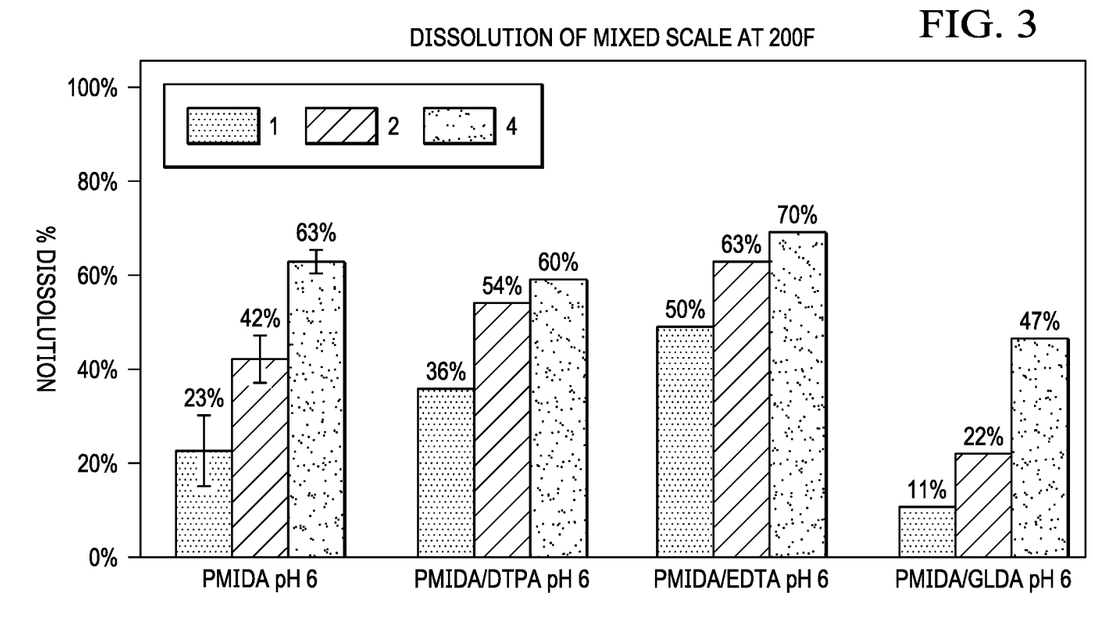
FIG. 3 is a graph illustrating a comparison of mixed scale dissolution for two example formulations of a treatment fluid in accordance with one or more examples described herein.

The pH of each dissolver fluid containing the specified amount of dissolver agent, listed in Table 1, and water was adjusted with potassium hydroxide and/or hydrochloric acid to achieve a pH of 6. The dissolution of the synthetic mixture of inorganic scales is presented in the subsequent figures. FIG. 3 illustrates the results which indicate that PMIDA dissolves 63% of the mass of the mixed scale within 4 hours. Mixtures of PMIDA with the other chelants achieve similar dissolution.

Example 2

Figure 4:
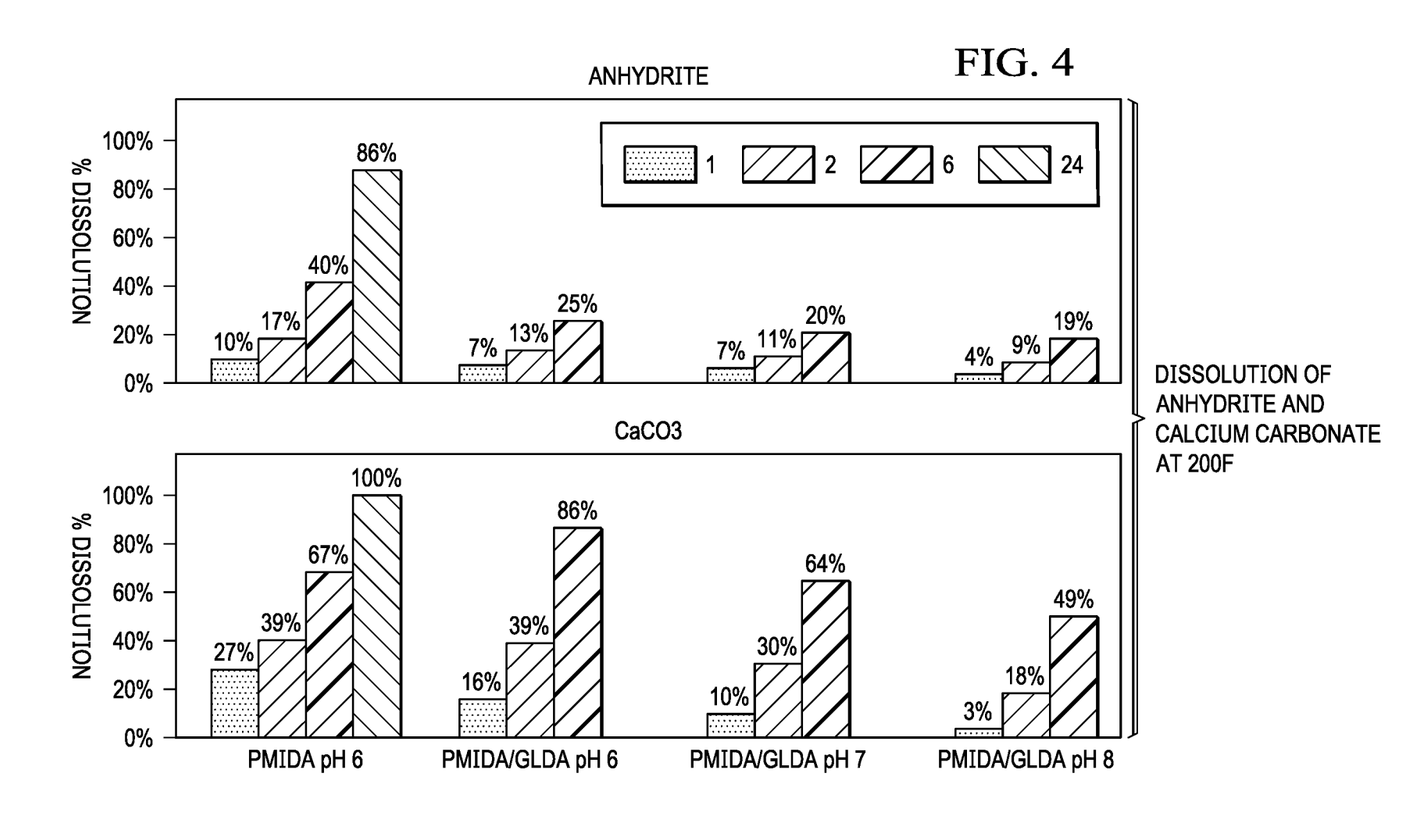
FIG. 4 is a graph illustrating scale dissolution for an example formulation of a treatment fluid in accordance with one or more examples described herein.

A second experiment was performed using the method of Example 1 except the dissolution of either calcium sulfate or calcium carbonate was measure independently and only GLDA was used as the measured chelant. the compositions illustrated by Table 2. The results are illustrated by FIG. 4. The dissolution by PMIDA (pH 6) of either anhydrite (CaSO4) and calcite (CaCO3) proceeds at approximately the same at 4-h and is complete at 24-h. Using combinations with GLDA provides faster (6-h) and effective (86%) dissolution of CaCO3, but not of anhydrite. Increasing the pH to 7 or 8 does not yield faster dissolution and the overall mass dissolution decreases with respect to PMIDA alone.

TABLE 2

|  | % (w/v) PMIDA | % (w/v) GLDA | pH |
|---|---|---|---|
| EXP 1 | 20 | 0 | 6 |
| EXP 2 | 20 | 20 | 6 |
| EXP 3 | 20 | 20 | 7 |
| EXP 4 | 20 | 20 | 8 |

Example 3

Figure 5:
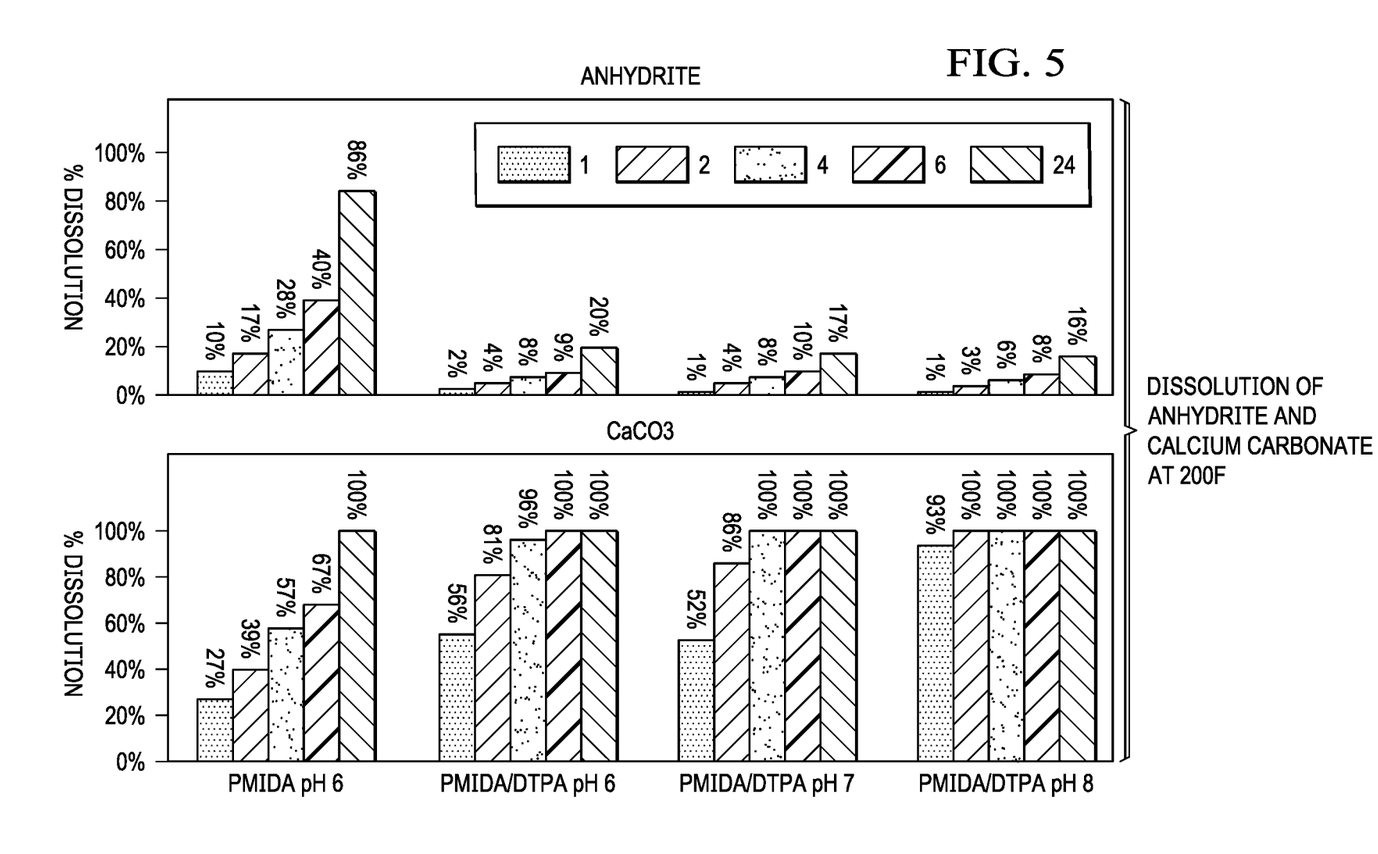
FIG. 5 is a graph illustrating scale dissolution for an example formulation of a treatment fluid in accordance with one or more examples described herein.

A third experiment was performed using the method of Example 1 except the dissolution of either calcium sulfate or calcium carbonate was measure independently and only DTPA was used as the measured chelant. The compositions illustrated by Table 3. The results are illustrated by FIG. 5. The dissolution of the synthetic mixed scale by a combination of PMIDA and DTPA showed very high overall efficiency towards calcite primarily, even better than the PMIDA/GLDA mixture. The dissolution of anhydrite was not better than the PMIDA/GLDA mixture at any of the pH values tested.

TABLE 3

|  | % (w/v) PMIDA | % (w/v) DTPA | pH |
|---|---|---|---|
| EXP 1 | 20 | 0 | 6 |
| EXP 2 | 20 | 20 | 6 |
| EXP 3 | 20 | 20 | 7 |
| EXP 4 | 20 | 20 | 8 |

Example 4

An experiment was performed using the method of Example 1. The dissolution of the synthetic mixed scale by bis-phosphono-alkyl aminoacetic acid (BPMG) showed comparable overall efficiency towards calcite and anhydrite (70% total dissolution in 4-h and 79% dissolution in 6-h) at pH 6. At 2-h the dissolution was similar to that of pH 6 PMIDA (47% vs. 42%).

It is also to be recognized that the disclosed treatment fluids may also directly or indirectly affect the various downhole equipment and tools that may contact the treatment fluids disclosed herein. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the methods and systems generally described above and depicted in FIGS. 1-5.

Provided are methods of removing mixed scale in accordance with the disclosure and the illustrated FIGS. An example method comprises introducing a treatment fluid into a wellbore comprising a mixed scale of interspersed calcium carbonate and calcium sulfate. The treatment fluid comprises: phosphonomethyliminodiacetic acid, N,N-bis (phosphonomethyl)glycine, or a combination thereof; and an aqueous base fluid. The treatment fluid has a pH in a range between about 6 to about 8. The method further comprises contacting the mixed scale with the treatment fluid.

Additionally or alternatively, the method may include one or more of the following features individually or in combination. The treatment fluid may be a single treatment fluid; wherein 60% of the mixed scale is dissolved within a six hour period after the contacting of the mixed scale with the treatment fluid without the introduction of an additional treatment fluid. The mixed scale may not be treated with xylene or toluene prior to the introducing the treatment fluid into the wellbore. The phosphonomethyliminodiacetic acid or N,N-bis(phosphonomethyl) may be present in a concentration in a range between about 1% (w/v) to about 50% (w/v). The treatment fluid may further comprise a chelating agent selected from the group consisting of hydroxyethyl-enediaminetetraacetic acid, N-(2-hydroxethyl)ethylenediaminetriacetic acid, hydroxyethyliminodiacetic acid, methylglycine diacetic acid, gluconic acid diacetic acid, ethylenediaminedisuccinic acid, beta-alaninediacetic acid, diethylenetriaminepentaacetic acid, cyclohexylenediami-netetraacetic acid, nitrilotriacetic acid, diphenylaminesulfonic acid, polyaminoacids, polyaspartic acid, polyitaconic acid, polysuccinic acid, polylactic acid, polyglycolic acid, and any combination thereof. The chelating agent may be present in a concentration in a range between about 1% (w/v) to about 40% (w/v). The treatment fluid may further comprise a surfactant selected from the group consisting of fatty acid alkoxylates, amine oxides, alkanolamides, alkoxy-lated alcohols, alkylamine alkoxylates, alkyl glycosides, and any combination thereof. The treatment fluid may not comprise carbonate or bicarbonate. The treatment fluid may not comprise a carboxylate-containing alkanol, a carboxylated alkyl halide, or a multicarboxylic acid. The ratio of calcium carbonate to calcium sulfate in the mixed scale may be in a range between about 90/10 to about 25/75. The pH of the treatment fluid may be in a range between about 6.5 to about 7.5.

Provided are treatment fluids for removing mixed scale in accordance with the disclosure and the illustrated FIGS. An example treatment fluid comprises phosphonomethylimino-diacetic acid; N N-bis(phosphonomethyl)glycine; or a combination thereof. The treatment fluid further comprises an aqueous base fluid. The treatment fluid has a pH in a range between about 6 to about 8 does not comprise a carboxylate-containing alkanol, a carboxylated alkyl halide, or a multi-carboxylic acid. The treatment fluid also does not comprise carbonate or bicarbonate.

Additionally or alternatively, the treatment fluid may include one or more of the following features individually or in combination. The treatment fluid may be a single treatment fluid; wherein 60% of the mixed scale is dissolved within a six hour period after the contacting of the mixed scale with the treatment fluid without the introduction of an additional treatment fluid. The mixed scale may not be treated with xylene or toluene prior to the introducing the treatment fluid into the wellbore. The phosphonomethyliminodiacetic acid or N N-bis(phosphonomethyl)glycine may be present in a concentration in a range between about 1% (w/v) to about 50% (w/v). The treatment fluid may further comprise a chelating agent selected from the group consisting of hydroxyethylenediaminetetraacetic acid, N-(2-hydroxyethyl)ethylenediaminetriacetic acid, hydroxyethyliminodiacetic acid, methylglycine diacetic acid, gluconic acid diacetic acid, ethylenediaminedisuccinic acid, beta-alaninediacetic acid, diethylenetriaminepentaacetic acid, cyclohexylenediaminetetraacetic acid, nitrilotriacetic acid, diphenylaminesulfonic acid, polyaminoacids, polyaspartic acid, polyitaconic acid, polysuccinic acid, polylactic acid, polyglycolic acid, and any combination thereof. The chelating agent may be present in a concentration in a range between about 1% (w/v) to about 40% (w/v). The treatment fluid may further comprise a surfactant selected from the group consisting of fatty acid alkoxylates, amine oxides, alkanolamides, alkoxylated alcohols, alkylamine alkoxylates, alkyl glycosides, and any combination thereof. The treatment fluid may not comprise carbonate or bicarbonate. The treatment fluid may not comprise a carboxylate-containing alkanol, a carboxylated alkyl halide, or a multicarboxylic acid. The ratio of calcium carbonate to calcium sulfate in the mixed scale may be in a range between about 90/10 to about 25/75. The pH of the treatment fluid may be in a range between about 6.5 to about 7.5.

Provided are systems for removing mixed scale in accordance with the disclosure and the illustrated FIGS. An example system comprises a treatment fluid comprising phosphonomethyliminodiacetic acid; N N-bis(phosphonomethyl)glycine; or a combination thereof. The treatment fluid further comprises an aqueous base fluid. The treatment fluid has a pH in a range between about 6 to about 8 does not comprise a carboxylate-containing alkanol, a carboxylated alkyl halide, or a multicarboxylic acid. The treatment fluid also does not comprise carbonate or bicarbonate. The system further comprises mixing equipment configured to mix the phosphonomethyliminodiacetic acid and the aqueous base fluid to provide the treatment fluid; and pumping equipment configured to pump the treatment fluid into the wellbore to a location comprising the mixed scale.

Additionally or alternatively, the system may include one or more of the following features individually or in combination. The pumping equipment may be configured to not circulate the treatment fluid during a reaction time in which the treatment fluid is contacting the mixed scale. The treatment fluid may be a single treatment fluid; wherein 60% of the mixed scale is dissolved within a six hour period after the contacting of the mixed scale with the treatment fluid without the introduction of an additional treatment fluid. The mixed scale may not be treated with xylene or toluene prior to the introducing the treatment fluid into the wellbore. The phosphonomethyliminodiacetic acid or N,N-bis(phosphonomethyl)glycine may be present in a concentration in a range between about 1% (w/v) to about 50% (w/v). The treatment fluid may further comprise a chelating agent selected from the group consisting of hydroxyethylenediaminetetraacetic acid, N-(2-hydroxyethyl)ethylenediaminetriacetic acid, hydroxyethyliminodiacetic acid, methylglycine diacetic acid, gluconic acid diacetic acid, ethylenediaminedisuccinic acid, beta-alaninediacetic acid, diethylenetriaminepentaacetic acid, cyclohexylenediaminetetraacetic acid, nitrilotriacetic acid, diphenylaminesulfonic acid, polyaminoacids, polyaspartic acid, polyitaconic acid, polysuccinic acid, polylactic acid, polyglycolic acid, and any combination thereof. The chelating agent may be present in a concentration in a range between about 1% (w/v) to about 40% (w/v). The treatment fluid may further comprise a surfactant selected from the group consisting of fatty acid alkoxylates, amine oxides, alkanolamides, alkoxylated alcohols, alkylamine alkoxylates, alkyl glycosides, and any combination thereof. The treatment fluid may not comprise carbonate or bicarbonate. The treatment fluid may not comprise a carboxylate-containing alkanol, a carboxylated alkyl halide, or a multicarboxylic acid. The ratio of calcium carbonate to calcium sulfate in the mixed scale may be in a range between about 90/10 to about 25/75. The pH of the treatment fluid may be in a range between about 6.5 to about 7.5.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems and methods can also "consist essentially of or "consist of the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method of removing mixed scale, the method comprising:
   introducing a treatment fluid into a wellbore comprising a mixed scale of interspersed calcium carbonate and calcium sulfate, wherein the treatment fluid comprises:
   N,N-bis(phosphonomethyl)glycine, and
   an aqueous base fluid; wherein the treatment fluid has a pH in a range between about 6 to about 8; and
   contacting the mixed scale with the treatment fluid.

2. The method of claim 1, wherein the treatment fluid is a single treatment fluid.

3. The method of claim 1, wherein 60% of the mixed scale is dissolved within a six hour period after the contacting of the mixed scale with the treatment fluid without the introduction of an additional treatment fluid.

4. The method of claim 1, wherein the mixed scale is not treated with xylene or toluene prior to the introducing the treatment fluid into the wellbore.

5. The method of claim 1, wherein the N,N-bis(phosphonomethyl)glycine is present in a concentration in a range between about 1% (w/v) to about 50% (w/v).

6. The method of claim 1, wherein the treatment fluid further comprises a chelating agent selected from the group consisting of hydroxyethylenediaminetetraacetic acid, N-(2-hydroxethyl)ethylenediaminetriacetic acid, hydroxyethyliminodiacetic acid, methylglycine diacetic acid, gluconic acid diacetic acid, ethylenediaminedisuccinic acid, beta-alaninediacetic acid, diethylenetriaminepentaacetic acid, cyclohexylenediaminetetraacetic acid, nitrilotriacetic acid, diphenylaminesulfonic acid, polyaminoacids, polyaspartic acid, polyitaconic acid, polysuccinic acid, polylactic acid, polyglycolic acid, and any combination thereof.

7. The method of claim 1, wherein the treatment fluid further comprises a surfactant selected from the group consisting of fatty acid alkoxylates, amine oxides, alkanolamides, alkoxylated alcohols, alkylamine alkoxylates, alkyl glycosides, and any combination thereof.

8. The method of claim 1, wherein the treatment fluid does not comprise carbonate or bicarbonate.

9. The method of claim 1, wherein the treatment fluid does not comprise a carboxylate-containing alkanol, a carboxylated alkyl halide, or a multicarboxylic acid.

10. The method of claim 1, wherein the ratio of calcium carbonate to calcium sulfate in the mixed scale is in a range between about 90/10 to about 25/75.

11. The method of claim 1, wherein the pH of the treatment fluid is in a range between about 6.5 to about 7.5.

12. A treatment fluid for treating mixed scale, the treatment fluid comprising:
   N,N-bis(phosphonomethyl)glycine, and
   an aqueous base fluid; wherein the treatment fluid has a pH in a range between about 6 to about 8; wherein the treatment fluid does not comprise a carboxylate-containing alkanol, a carboxylated alkyl halide, or a multicarboxylic acid; and wherein the treatment fluid does not comprise carbonate or bicarbonate.

13. The treatment fluid of claim 12, wherein the N,N-bis(phosphonomethyl)glycine is present in a concentration in a range between about 1% (w/v) to about 50% (w/v).

14. The treatment fluid of claim 12, wherein the treatment fluid further comprises a chelating agent selected from the group consisting of hydroxyethylenediaminetetraacetic acid, N-(2-hydroxyethyl)ethylenediaminetriacetic acid, hydroxyethyliminodiacetic acid, methylglycine diacetic acid, gluconic acid diacetic acid, ethylenediaminedisuccinic acid, beta-alaninediacetic acid, diethylenetriaminepentaacetic acid, cyclohexylenediaminetetraacetic acid, nitrilotriacetic acid, diphenylaminesulfonic acid, polyaminoacids, polyaspartic acid, polyitaconic acid, polysuccinic acid, polylactic acid, polyglycolic acid, and any combination thereof.

15. The treatment fluid of claim 14, wherein the chelating agent is present in a concentration in a range between about 1% (w/v) to about 40% (w/v).

16. The treatment fluid of claim 12, wherein the treatment fluid further comprises a surfactant selected from the group consisting of fatty acid alkoxylates, amine oxides, alkanolamides, alkoxylated alcohols, alkylamine alkoxylates, alkyl glycosides, and any combination thereof.

17. A system for removing mixed scale from a wellbore, the system comprising:
   a treatment fluid comprising:
   N,N-bis(phosphonomethyl)glycine, and
   an aqueous base fluid; wherein the treatment fluid has a pH in a range between about 6 to about 8; wherein the treatment fluid does not comprise a carboxylate-containing alkanol, a carboxylated alkyl halide, or a multicarboxylic acid; and wherein the treatment fluid does not comprise carbonate or bicarbonate;
   mixing equipment configured to mix the N,N-bis(phosphonomethyl)glycine and the aqueous base fluid to provide the treatment fluid; and
   pumping equipment configured to pump the treatment fluid into the wellbore to a location comprising the mixed scale.

18. The system of claim 17, wherein the pumping equipment is configured to not circulate the treatment fluid during a reaction time in which the treatment fluid is contacting the mixed scale.

19. The system of claim 17, wherein the treatment fluid further comprises a chelating agent selected from the group consisting of hydroxyethylenediaminetetraacetic acid, N-(2-hydroxyethyl)ethylenediaminetriacetic acid, hydroxyethyliminodiacetic acid, methylglycine diacetic acid, gluconic acid diacetic acid, ethylenediaminedisuccinic acid, beta-alaninediacetic acid, diethylenetriaminepentaacetic acid, cyclohexylenediaminetetraacetic acid, nitrilotriacetic acid, diphenylaminesulfonic acid, polyaminoacids, polyaspartic acid, polyitaconic acid, polysuccinic acid, polylactic acid, polyglycolic acid, and any combination thereof.

20. The system of claim 17, wherein the treatment fluid further comprises a surfactant selected from the group consisting of fatty acid alkoxylates, amine oxides, alkanolamides, alkoxylated alcohols, alkylamine alkoxylates, alkyl glycosides, and any combination thereof.

* * * * *